(12) United States Patent
Vacca et al.

(10) Patent No.: US 11,970,055 B2
(45) Date of Patent: Apr. 30, 2024

(54) DEVICE FOR CLOSING A FRONT-END AIR INTAKE OF A MOTOR VEHICLE, HAVING A FLAP DISCONNECTION DEVICE

(71) Applicant: Valeo Systemes Thermiques, Le Mesnil Saint-Denis (FR)

(72) Inventors: Frédéric Vacca, Le Mesnil Saint Denis (FR); Karim Arab, Le Mesnil Saint Denis (FR); Laura Marion, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 216 days.

(21) Appl. No.: 17/430,560

(22) PCT Filed: Jan. 30, 2020

(86) PCT No.: PCT/FR2020/050145
§ 371 (c)(1),
(2) Date: Aug. 12, 2021

(87) PCT Pub. No.: WO2020/165520
PCT Pub. Date: Aug. 20, 2020

(65) Prior Publication Data
US 2022/0126679 A1   Apr. 28, 2022

(30) Foreign Application Priority Data
Feb. 13, 2019  (FR) ...................................... 1901458

(51) Int. Cl.
*B60K 11/00* (2006.01)
*B60K 11/08* (2006.01)

(52) U.S. Cl.
CPC ................. *B60K 11/085* (2013.01)

(58) Field of Classification Search
CPC .............................. B60K 11/085; B60K 11/00
(Continued)

(56) References Cited

U.S. PATENT DOCUMENTS 9,233,605 B2 * 1/2016 Hijikata ............... B60K 11/085
10,100,707 B2 * 10/2018 Wolf .................... B60K 11/085
(Continued)

FOREIGN PATENT DOCUMENTS

| CN | 101879917 A | 11/2010 |
| CN | 104080692 A | 10/2014 |

(Continued)

OTHER PUBLICATIONS

International Search Report with Written Opinion in corresponding International Application No. PCT/FR2020/050145, dated Jun. 2, 2020 (12 pages).

(Continued)

*Primary Examiner* — Hau V Phan
(74) *Attorney, Agent, or Firm* — Osha Bergman Watanabe & Burton LLP (57) ABSTRACT

A blocking device for a front end air inlet of a motor vehicle, comprising at least one stop, a support frame, at least one flap arranged inside the support frame. The at least one flap comprises a first end and a second end. The second end of the at least one flap comprises a release device. The release device comprises a first part and a second part which are connected by a male/female device. The first part of the release device is configured to come into contact with said at least one stop such that the first part and the second part move apart from one another by the rotation of the second part.

18 Claims, 12 Drawing Sheets

(58) Field of Classification Search
USPC .................................................. 180/68.5
See application file for complete search history.

(56) References Cited

U.S. PATENT DOCUMENTS

| | | | | |
|---|---|---|---|---|
| 2010/0243352 A1* | 9/2010 | Watanabe | ............ | B60K 11/085 180/68.1 |
| 2013/0001454 A1* | 1/2013 | Schwarz | ............. | B60K 11/085 251/304 |
| 2013/0146375 A1* | 6/2013 | Lee | ............ | F01P 7/10 180/68.1 |
| 2013/0223980 A1* | 8/2013 | Pastrick | ............... | B60K 11/085 415/1 |
| 2013/0252531 A1* | 9/2013 | Asano | ............... | B60K 11/085 454/155 |
| 2013/0275009 A1* | 10/2013 | Sakai | .................... | B60K 11/085 701/49 |
| 2013/0284401 A1* | 10/2013 | Kiener | ................... | F28F 27/02 165/98 |
| 2014/0039765 A1* | 2/2014 | Charnesky | .......... | B60K 11/085 701/49 |
| 2014/0094104 A1* | 4/2014 | Manhire | ............. | B60K 11/085 454/152 |
| 2014/0170960 A1* | 6/2014 | Vacca | ................. | B60K 11/085 454/333 |
| 2014/0273806 A1* | 9/2014 | Frayer, III | ........... | B60K 11/085 454/335 |
| 2015/0231962 A1* | 8/2015 | Ruppert | ................. | B60R 19/52 180/68.1 |
| 2016/0207394 A1* | 7/2016 | Vacca | ................... | B60K 11/085 |
| 2016/0236563 A1* | 8/2016 | Ruppert | ................. | B60R 19/52 |
| 2016/0272060 A1 | 9/2016 | Edwards et al. | | |
| 2017/0248066 A1* | 8/2017 | Wolf | ..................... | B60K 11/085 |
| 2018/0170171 A1 | 6/2018 | Solazzo et al. | | |
| 2019/0184813 A1* | 6/2019 | Lindberg | ................ | F24F 13/15 |

FOREIGN PATENT DOCUMENTS

| | | |
|---|---|---|
| CN | 107848405 A | 3/2018 |
| CN | 107995898 A | 5/2018 |
| CN | 108136892 A | 6/2018 |
| CN | 108340772 A | 7/2018 |
| CN | 109476062 A | 3/2019 |
| FR | 3020021 A1 | 10/2015 |
| FR | 3047198 A1 | 8/2017 |
| FR | 3052111 A1 | 12/2017 |
| WO | 2013012337 A1 | 1/2013 |
| WO | 2018078261 A1 | 5/2018 |

OTHER PUBLICATIONS

Office Action issued in corresponding CN Application No. 202080014051.3; dated Oct. 8, 2023. (7 pages).

* cited by examiner

DEVICE FOR CLOSING A FRONT-END AIR INTAKE OF A MOTOR VEHICLE, HAVING A FLAP DISCONNECTION DEVICE

TECHNICAL FIELD

Field of the Invention

The present invention relates to the field of devices for blocking the air flow at the front end of a motor vehicle, and more particularly a blocking device comprising a flap release device.

The front ends of motor vehicles generally comprise one or more main air inlets, via which an air flow enters in the direction of the front compartment of the motor vehicle. Heat exchangers of the motor vehicle, such as for example that used for air-conditioning the passenger compartment and/or that used for cooling the engine, are generally placed behind these air inlets.

It is also known to provide, in the path of air passing through the main air inlets, a support frame having one or more pivotably mounted flaps which are able to adopt a multiplicity of different angular positions between an open position and a closed position, thus forming a blocking device resembling a shutter. This blocking device is sometimes called an active grille blocking device, or controlled air inlet module. Such a blocking device may also be known as an AGS (active grille shutter).

The blocking device allows adjustment of the air flow passing through the air inlets and meeting the heat exchangers. It is thus possible to optimize the effectiveness of these heat exchangers depending on the requirements by varying the amount of air that they receive. In addition, at high speed, in the closed position, the flaps allow the drag coefficient of the motor vehicle to be reduced, and thus improve the aerodynamics of said motor vehicle. The blocking device may thus reduce the energy consumption and pollution when the engine does not need to be cooled by the exterior air.

However, as a result of shocks, a flap may break and no longer be able to perform its task of controlling the air inflow. This broken flap generally remains attached to the support frame and is difficult to detect without direct visual inspection. The broken flap is generally removed manually and may be replaced during this visual inspection. However, the time between breakage and the moment of removing the broken flap may be long, which may have a negative impact on the performance of the blocking device, in particular if the broken flap remains in the closed position.

The object of the present invention is therefore to at least partially remedy the drawbacks of the prior art and propose a blocking device in which a broken flap does not remain in place in the support frame.

SUMMARY OF THE INVENTION

The present invention therefore concerns a blocking device for a front end air inlet of a motor vehicle, comprising:
- a.—a support frame having at least two lateral uprights and two end cross-pieces connecting the two lateral uprights,
- b.—at least one flap arranged inside the support frame and pivoting around a pivot axis between a first open end position and a second closed end position, said at least one flap comprising a flap body, a first end connected to the support frame by a first pivot connection, wherein said first end may be connected to a drive device, and the flap furthermore comprises in particular a second end opposite the first end, connected to the support frame by a second pivot connection,
- c. characterized in that the first end of the at least one flap comprises a release device of said flap,
- d. said release device comprising:
  - i.—a first part connected to the flap body, and
  - ii.—a second part arranged opposite the first part and comprising the first pivot connection to the support frame and possibly the connection to the drive device,
- e. the blocking device, in particular the support frame or drive device comprising at least one stop, the first part of the release device and/or the flap body being configured to come into contact with said at least one stop, in particular when the flap occupies its first open end position or its second closed end position, such that when the first part of the release device and/or the flap body are or come into contact with said stop, the first and the second parts move apart from one another by the rotation of the second part.

The term "release" means the detachment of the flap from the support frame, or the separation of the two parts of the release device, or the separation of the flap, in particular the flap body and the support frame.

According to one aspect of the invention, the first and second parts of the release device are connected by a male/female device comprising at least one first contact zone able to transmit the rotational movements of the drive device to the flap body so towards the first open end position, and at least one second contact zone able to transmit the rotational movements of the drive device to the flap body towards the second closed end position, at least one of the first or second contact zones of the male/female device forming an angle with a parallel to the pivot axis.

According to another aspect of the invention, only the first contact zone between the first and second parts of the release device forms an angle with a parallel to the pivot axis.

According to another aspect of the invention, the first contact zone of the male/female device and the second contact zone of the male/female device both form an angle with a parallel to the pivot axis.

According to another aspect of the invention, the male/female device furthermore comprises:
- a.—a first base arranged on the first part of the release device,
- b.—a second base arranged on the second part of the release device opposite the first base,
- c.—at least one male member arranged on the one or the other of the first or second bases, said male member protruding parallel to the pivot axis, and
- d.—at least one female member complementary to the at least one male member and arranged on the base opposite the base carrying the at least one male member.

According to another aspect of the invention, the at least one male member or female member is arranged on a first ring concentric to the pivot axis and protruding parallel to said pivot axis, and the at least one complementary male member or female member is arranged on a second ring also concentric to the pivot axis and protruding parallel to said pivot axis,
- a. the first ring being intended to be inserted inside the second ring,
- b. the outer wall of the first ring and the inner wall of the second ring comprising a bead/groove pair perpendicular to the pivot axis and engaging in one another so as to clip the first part to the second part.

According to another aspect of the invention, the first part of the release device and the flap body are made of one piece.

According to another aspect of the invention, the flap body is extruded and the first part of the release device is a separate piece fixed to an end of said flap body.

According to another aspect of the invention, the first part of the release device comprises a stud protruding perpendicularly to the pivot axis and intended to come into contact with a stop.

According to another aspect of the invention, the drive device is configured to extend the rotational movement of the flap when the latter comes into contact with the at least one stop, and to detect the resistance to rotation of the at least one flap and stop its rotation on reaching a given resistance value, said drive device also being configured to stop its rotation when it reaches a predetermined travel exceeding that necessary for reaching the stop without encountering a resistance to rotation of the at least one flap, and to send an error signal to an electronic management system.

Naturally, the invention also concerns a flap for the blocking device as described above.

The flap according to the invention comprises a flap body, a first end able to be connected to a support frame via a first pivot connection, wherein said first end may be connected to a drive device, wherein the flap furthermore in particular comprises a second end opposite the first end and able to be connected to the support frame by a second pivot connection, a. characterized in that the first end of the at least one flap comprises a release device of said flap,
b. said release device comprising:
 i.—a first part connected to the flap body, and
 ii.—a second part arranged opposite the first part and comprising in particular the first pivot connection to the support frame and possibly the connection to the drive device, the first part of the release device and/or the flap body being configured such that, when the first part of the release device and/or the flap body comes into contact with a stop, the first and the second parts move apart from one another by the rotation of the second part.

The term "release" here means the disengagement or separation of the two parts of the release device.

BRIEF DESCRIPTION OF THE DRAWINGS

Other characteristics and advantages of the present invention will become more clearly apparent on reading the following description, provided by way of nonlimiting illustration, and the appended drawings, in which.

In these figures, identical elements carry the same numerical references.

The following embodiments are examples. Although the description refers to one or more embodiments, this does not necessarily mean that each reference relates to the same embodiment, or that the features apply only to one embodiment. Individual features of various embodiments can also be combined or interchanged in order to create other embodiments.

In the present description, some elements or parameters can be indexed, such as for example first element or second element, as well as first parameter and second parameter or even first criterion and second criterion, etc. In this case, this is simple indexing for differentiating and denoting elements or parameters or criteria that are similar but not identical. This indexing does not imply any priority of one element, parameter or criterion over another and such denominations can be easily interchanged without departing from the scope of the present description. Furthermore, this indexing does not imply any chronological order, for example, in assessing any given criterion.

In the description below, the terms "upper" and "lower" refer to the arrangement of the elements on the blocking device for the front end air inlet, in the mounted state of the blocking device on the motor vehicle.

Figure 1:
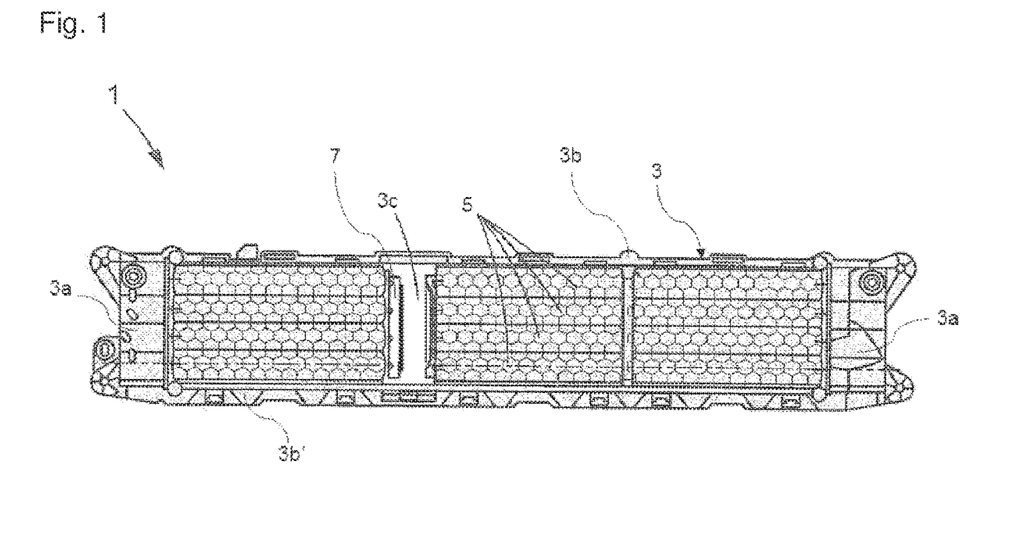
FIG. 1 shows a schematic, perspective illustration of the rear face of a blocking device when the flaps are in the closed end position.
Figure 2:
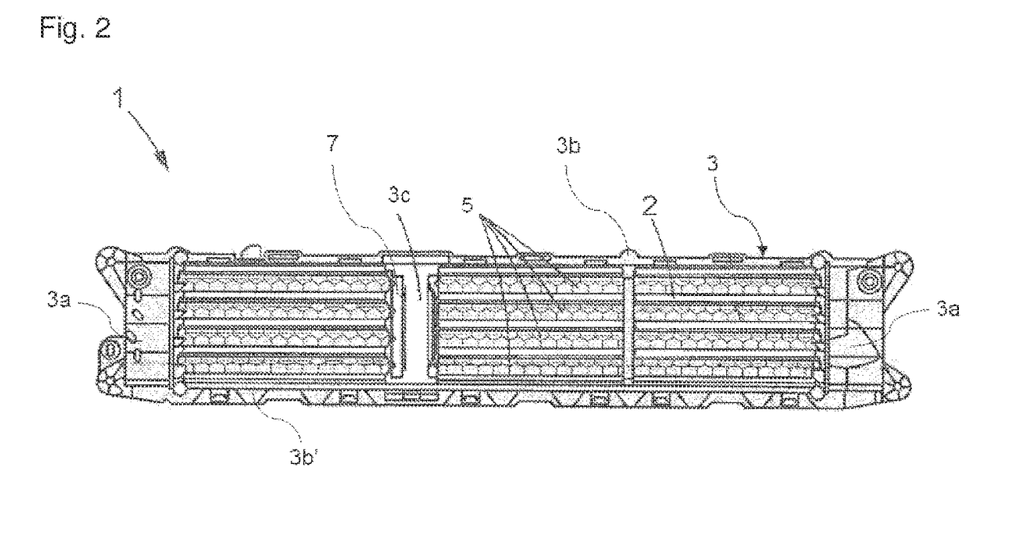
FIG. 2 shows a schematic, perspective illustration of the rear face of a blocking device when the flaps are in the open end position.

FIG. 1 and FIG. 2 show a blocking device 1 for the front end air inlet of the motor vehicle, depicting its front face and rear face respectively. The front face here means the face of the blocking device 1 intended to be oriented towards the front of the motor vehicle. The rear face here means the face of the blocking device 1 opposite the front face and intended to be oriented towards the rear of the motor vehicle.

The blocking device 1 comprises a support frame 3 with two lateral uprights 3a and two end cross-pieces 3b, 3b' connecting the two lateral uprights 3a together, thus defining an opening of the support frame 3. More particularly, the support frame 3 has an upper cross-piece 3b and a lower cross-piece 3b', these orientations corresponding arbitrarily to the arrangement of the blocking device 1 in mounted state in the motor vehicle. In the example shown in FIG. 1 and FIG. 2, the opening of the support frame 3 is divided into two by a central upright 3c connecting the upper cross-piece 3b and the lower cross-piece 3b'.

The support frame 3 has at least one flap 5 arranged inside the opening. This at least one flap 5 is mounted so as to pivot about a pivot axis P (shown on FIGS. 3 and 4) between a first open end position (shown on FIGS. 2 and 4) and a second closed end position (shown on FIGS. 1 and 3). When the at least one flap 5 occupies its first open end position, the air flow may pass through the opening of the support frame 3. When the at least one flap 5 occupies its second closed end position, said at least one flap 5 blocks the opening of the support frame 3 and prevents the passage of the air flow. Naturally, the flaps 5 are able to adopt any intermediate position.

Still in the example illustrated in FIGS. 1 and 2, the support frame 3 comprises a plurality of flaps 5, forming at least one set of flaps 5 arranged mutually parallel on a same plane and adjacent to one another. In the present case, the support frame 3 comprises two sets of flaps 5 each arranged in an opening. These openings are separated by the central upright 3c. The flaps 5 are arranged horizontally above one another.

Figure 4:
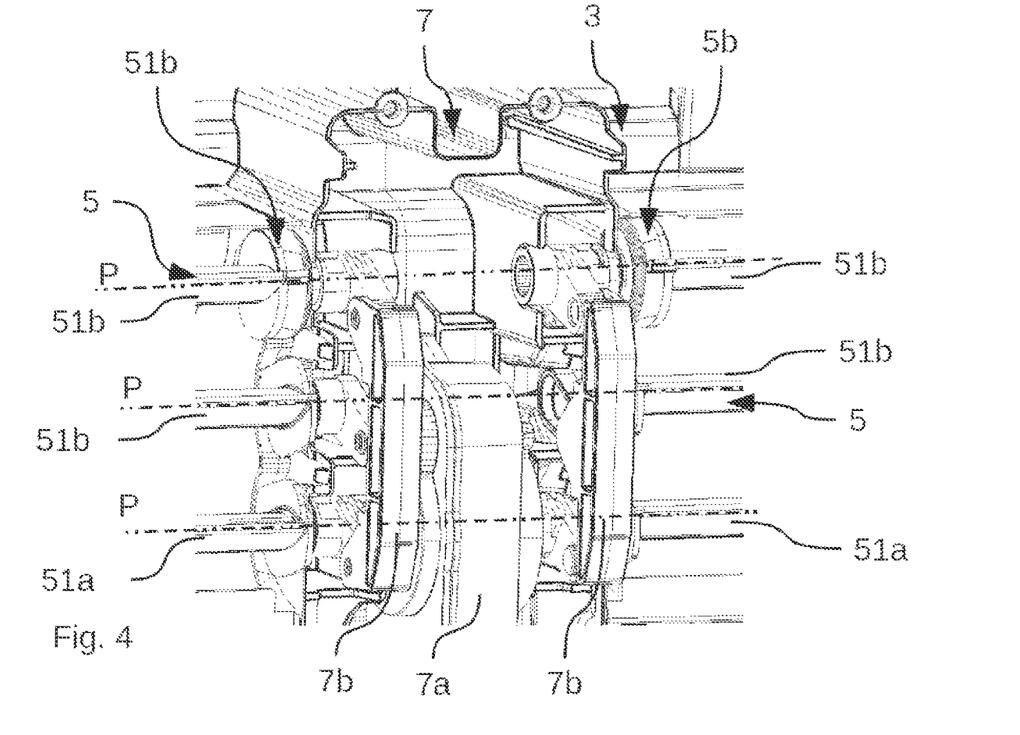
FIG. 4 shows a schematic, perspective illustration of the interior of the drive device in the open end position.

In other words, when the flaps 5 are in the open end position shown on FIG. 4, namely when they extend in a longitudinal and transverse direction relative to the support frame 3, the opening or air inlet is clear and the air flow may pass through the passage or opening defined by the support frame 3. When the set of flaps 5 is in the closed end position, i.e. they extend in a transverse and vertical direction relative to the support frame 3, or for example relative to the axes of the vehicle when the blocking device is installed in a vehicle, the air passage or opening defined by the support frame 3, namely an air inlet, is blocked and the air cannot pass through the support frame 3. As illustrated in FIG. 1, in this closed position, the set of flaps 5 constitutes an obstacle which, by its front surface, opposes the circulation of the air flow, and the opening of the support frame 3 is thus fully blocked. In other words, the blocking device 1 is configured to move from a closed position in which the flaps 5 fully close the opening of the support frame 3 and hence block the passage of the air flow F, to an open configuration in which the flaps 5 are positioned so as to allow passage of the air flow F with a maximum flow rate.

Furthermore, the support frame 3 has at least one drive device 7 (visible on FIG. 2) which is configured to control the positioning and hence the pivoting of the flaps 5 between their first open end position and their second closed end position.

Figure 3:
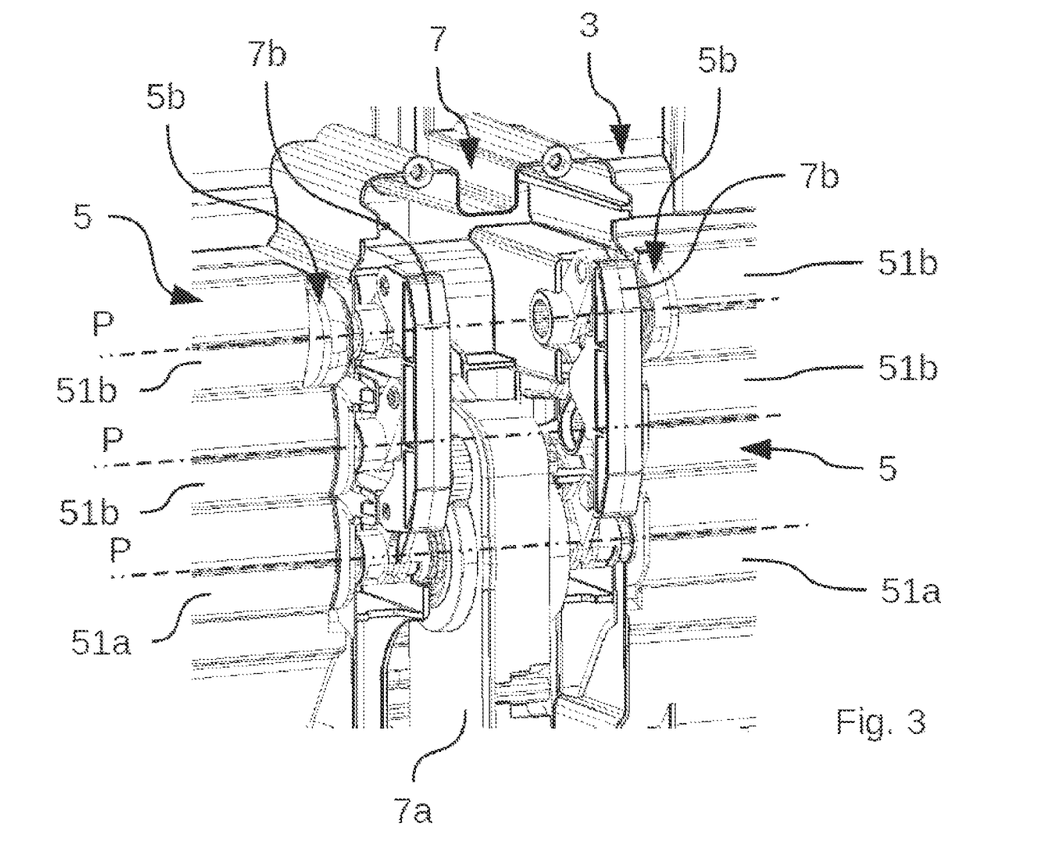
FIG. 3 shows a schematic, perspective illustration of the interior of the drive device in the closed end position.

The drive device 7 in particular comprises an actuator 7a and a control member 7b, shown on FIG. 3 and FIG. 4. On FIG. 2, the actuator 7a and the control member 7b are covered by a protective cover 7c. In the example illustrated in FIGS. 3 and 4, the actuator 7a is connected to a flap 5, called the motor flap 51a of the set of flaps 5, so as to drive the pivoting of this motor flap 51a. The other flaps 51b of the set of flaps 5 are connected to the motor flap 51a by the control member 7b, for example a rod, which transmits the pivot movement of the motor flap 51a to the other flaps 51b.

Other methods for transmitting the rotational movements of the actuator 7a to the set of flaps 5 are quite conceivable. For example, the actuator 7a may be directly connected to the control member 7b by a lever, wherein the actuator 7a then translates said control member 7b in order to pivot the flaps simultaneously.

Still in the example illustrated in FIGS. 1, 2, 3 and 4, the drive device 7 is arranged on the central upright 3c of the support frame 3 so that both sets of flaps can be pivoted simultaneously. According to a variant which is not shown here, the drive device 7 may be arranged on a lateral upright 3a of the support frame 3 so as to pivot a single set of flaps 5. Furthermore, the drive device 7 is here arranged on the rear face of the blocking device 1.

Figure 5:
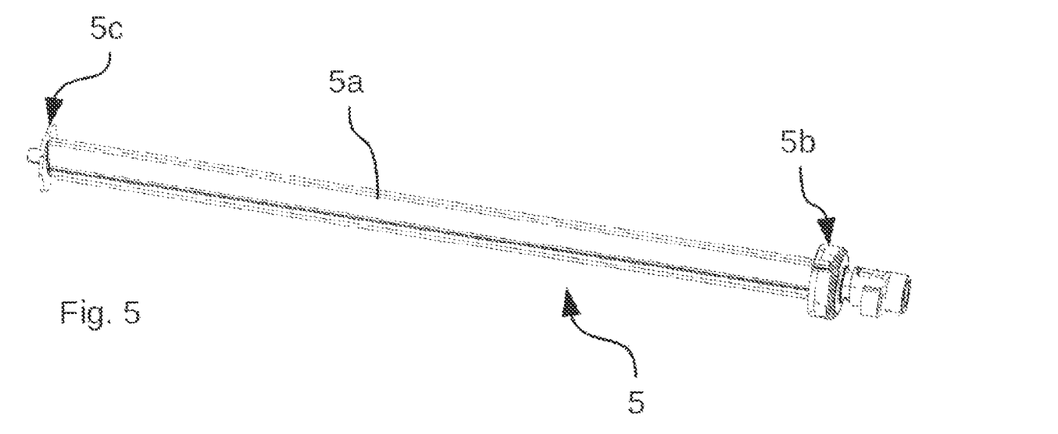
FIG. 5 shows a schematic, perspective depiction of a flap 5.
Figure 6:
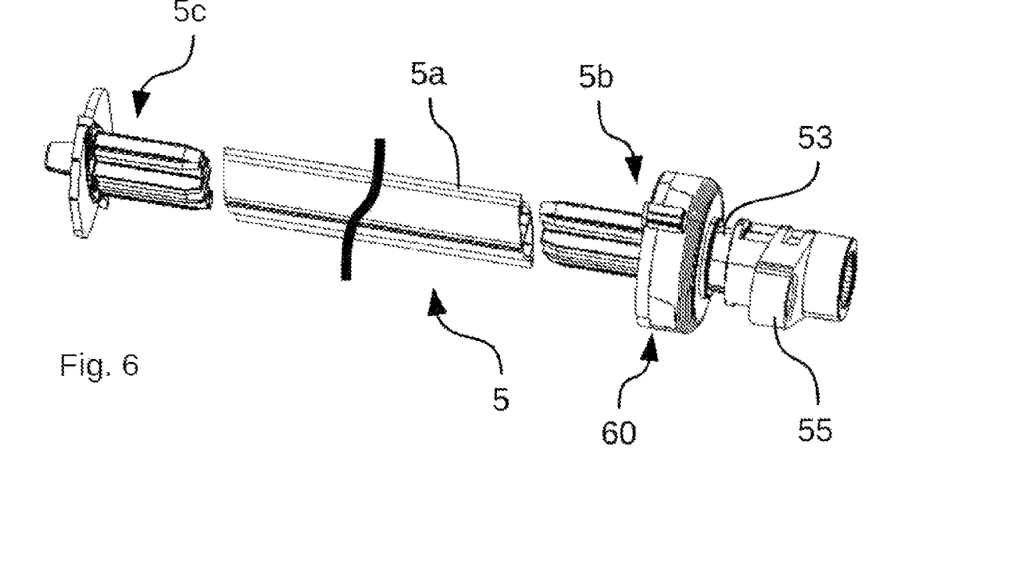
FIG. 6 shows a schematic, exploded perspective depiction of a flap 5.

As FIG. 5 shows, the at least one flap 5 in particular comprises an elongate flap body 5a, a first end 5b and a second end 5c opposite the first end 5b. The flap 5, which is generally made of plastic material, may for example be an extruded flap 5 as illustrated on FIG. 6. In this case, the flap body 5a is extruded and the first end 5b and second end 5c are separate pieces fixed to the ends of said flap body 5a. It is however quite possible to imagine another type of flap 5, for example a flap made of one piece, in particular by moulding.

The first end 5b of the flap 5 is connected to the support frame 3 by a first pivot connection (shown on FIG. 7) and connected to the drive device 7. On FIG. 7, the control member 7b and a flap 5 have been omitted for ease of comprehension.

Figure 7:
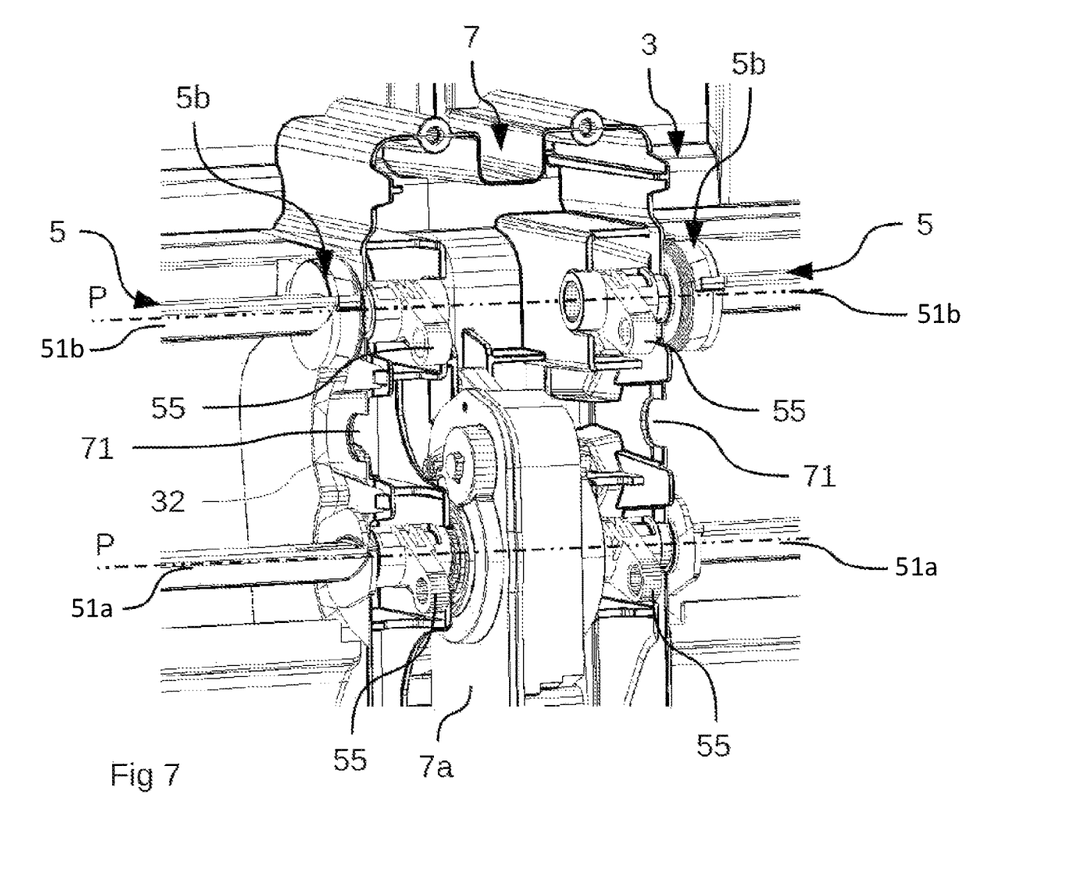
FIG. 7 shows a schematic, perspective depiction of the first pivot connection.

The first end 5b may be connected directly to the actuator 7a in the case of a motor flap 51a. The first end 5b may also be connected to the control member 7b by means of a connecting arm 55 extending in a direction which is generally perpendicular to the pivot axis P.

The first pivot connection may be formed for example by the coupling of a first notch 71 in a wall 32 of the drive device 7 perpendicular to the pivot axis P. The first end 5b of the flap 5 then comprises a circular second notch 53 (shown on FIG. 6) which is complementary to the first notch 71. The first end 5b of the flap is inserted in the first notch 71 such that the wall 32 enters the second notch 53.

Figure 8:
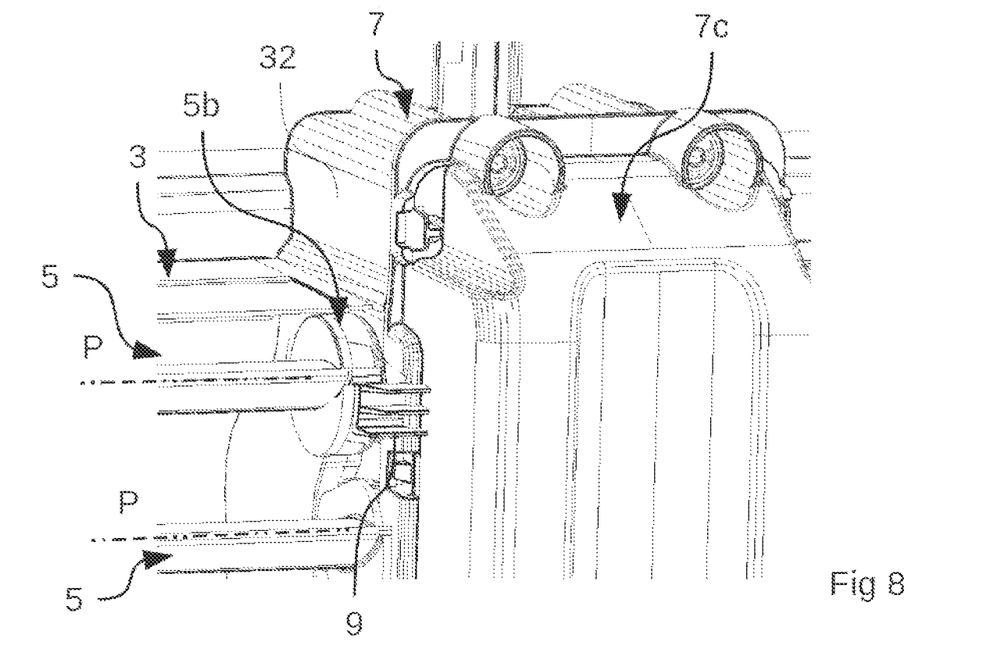
FIG. 8 shows a schematic, perspective illustration of the exterior of the drive device.

As FIG. 8 shows, the first end 5b of the flap 5 is held in the first notch 71 by the protective cover 7c which comes to cover the first notch 71 and close this, so as to form an orifice in which the first end 5b of the flap 5 may pivot.

Still as illustrated by FIG. 8, the blocking device 1 comprises at least one stop 9. This stop 9 is in particular intended to come into contact with the flap 5 when it occupies its first open end position or its second closed end position. This stop 9 opposes the pivoting of the flap 5 when it reaches one of its end positions. The stop 9 may in particular be arranged on the support frame 3 on a lateral upright 3a, 3b or on a central upright 3c, in particular at the level of the drive device 7. In the example shown in FIG. 8, a stop 9 is arranged on the protective cover 7c. The stop 9 may also be arranged directly on the support frame 3.

Figure 9:
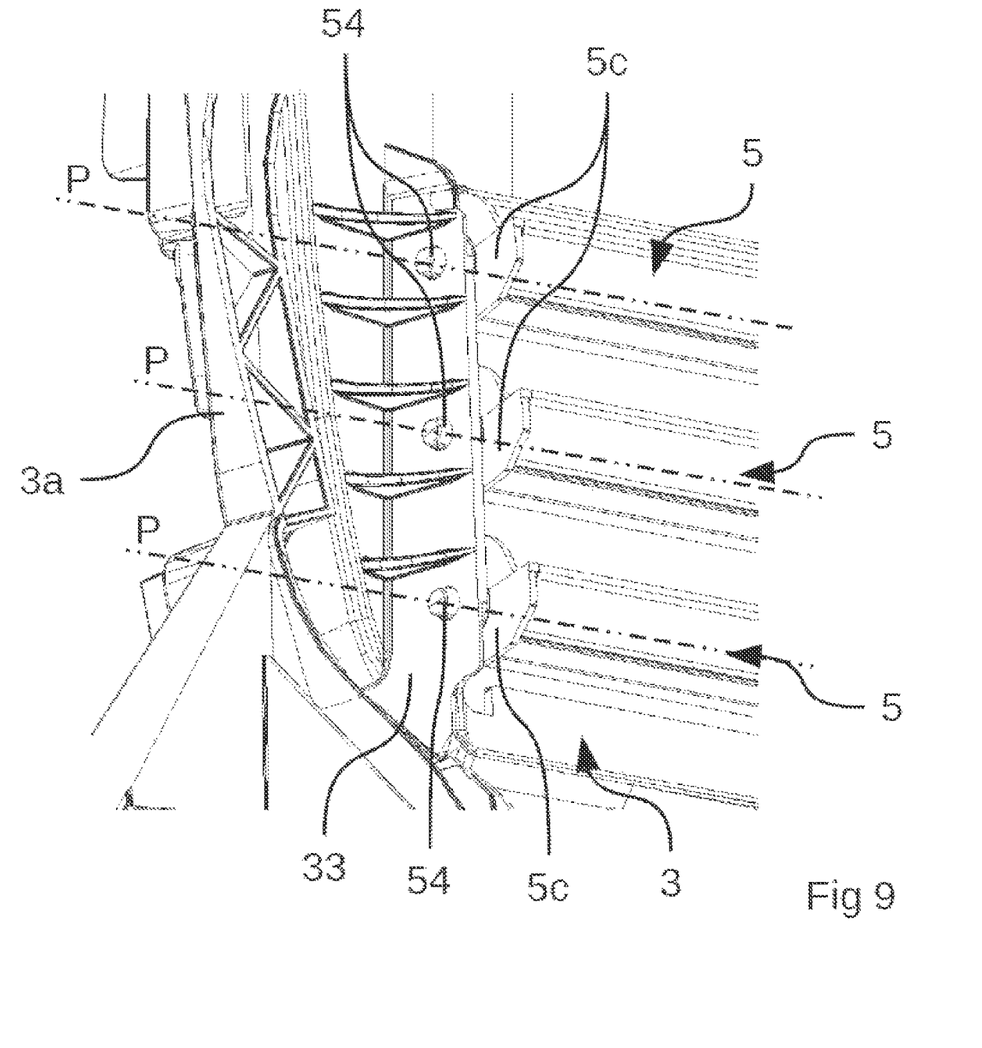
FIG. 9 shows a schematic, perspective depiction of the second pivot connection.

The second end 5c is itself connected to the support frame 3 by a second pivot connection, as shown in FIG. 9. The second end 5c may thus comprise a stud 54 protruding in the pivot axis P. This stud 54 comes to lie in an orifice made in a wall 33 of the support frame 3 extending perpendicularly to the pivot axis P. Here, this wall 33 is arranged on a lateral upright 3a.

Figure 10:
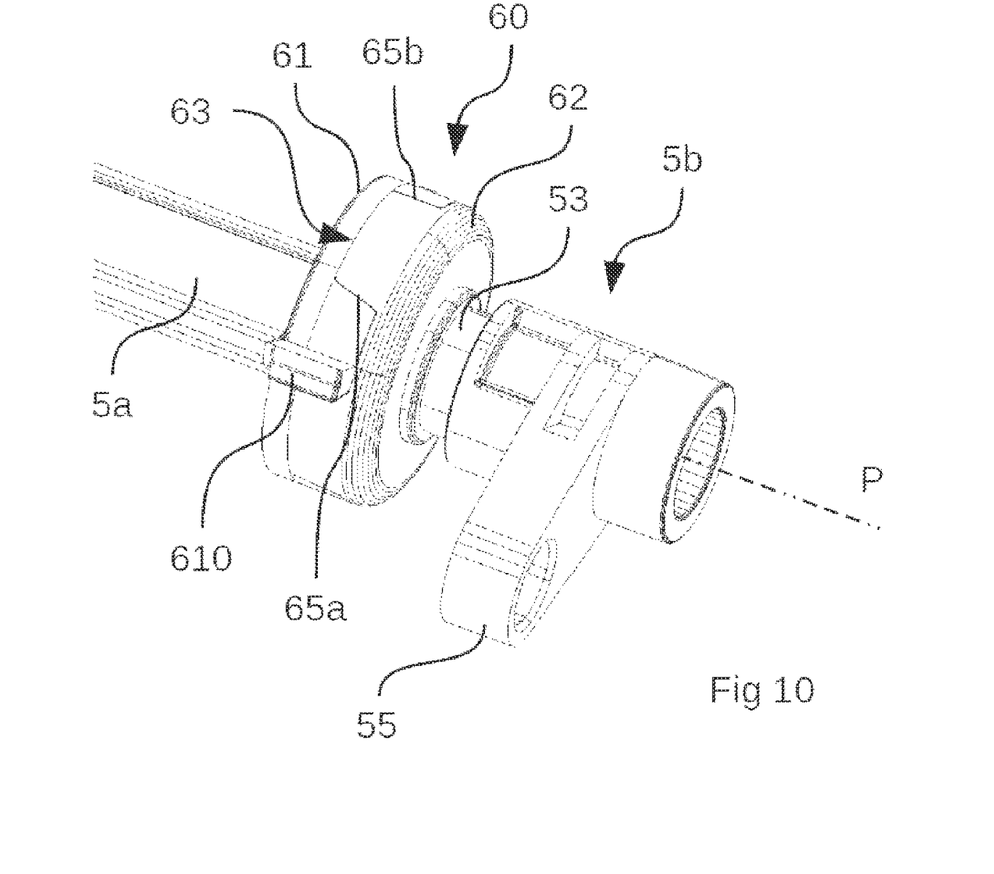
FIG. 10 shows a schematic, perspective depiction of the release device.
Figure 11:
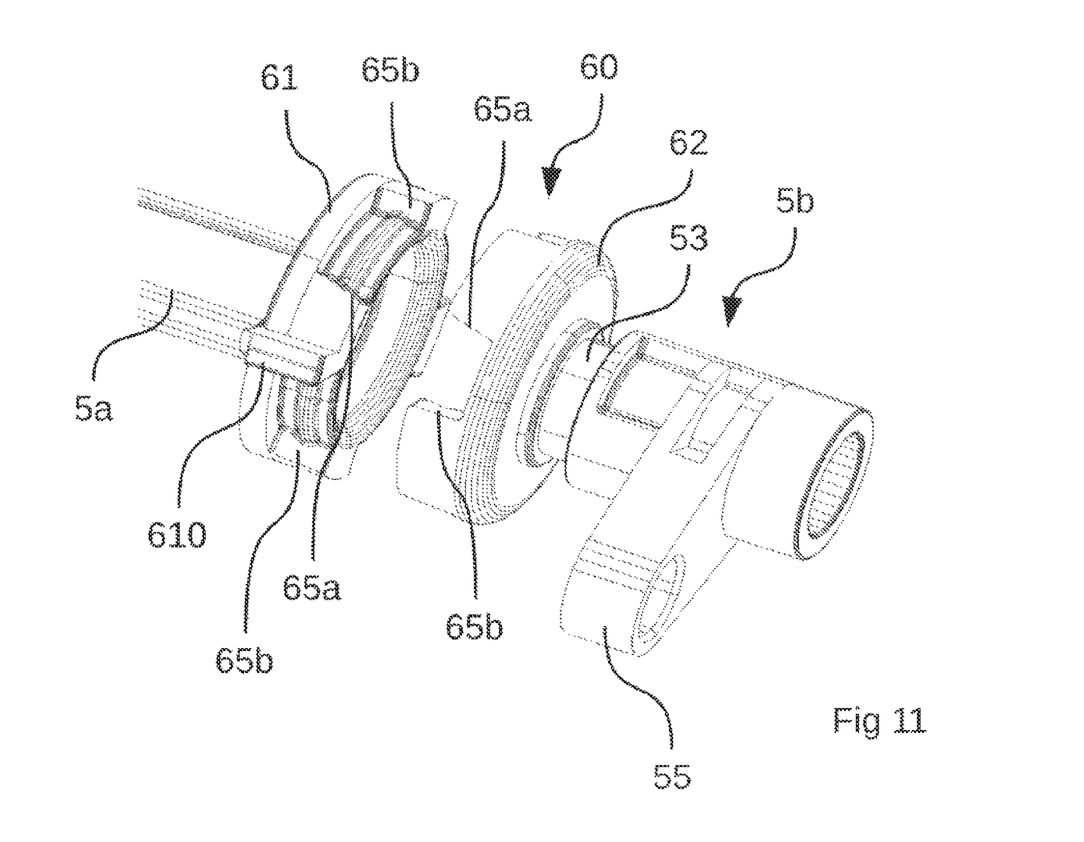
FIG. 11 shows a schematic, exploded perspective depiction of the release device.

As FIGS. 10 and 11 show in more detail, the second end 5b of the at least one flap 5 comprises a release device 60 of said flap 5. This release device 60 allows separation of the flap 5, and more particularly the flap body 5a, from the support frame 3 and thus allows it to fall, in order to prevent said flap 5 from remaining in the closed end position when broken and causing a loss of performance of the heat exchangers arranged behind the blocking device 1.

The release device 60 may in particular be arranged on one or more flaps 5 of a set of flaps 5. In the context of a blocking device 1 as illustrated on FIGS. 1 and 2, comprising a plurality of flaps 5 forming at least one set of flaps 5 arranged horizontally above one another, it may be advantageous if only the upper flap 5 of said set of flaps 5 comprises a release device 60. In fact, according to various feedback reports and experiments, this upper flap 5 is that which is most likely to break and hence hinder the circulation of the air flow in the opening of the support frame 3.

The detection device 60 comprises in particular:
- a first part 61 connected to the flap body 5a, and
- a second part 62 arranged opposite the first part 61.

The second part 62 of the release device 60 in particular comprises the first pivot connection to the support frame 3, more precisely the second notch 53. The second part 62 also comprises the connection to the drive device 7. More precisely, the second part 62 may comprise the connecting arm 55.

The first part 61 of the release device 60 and/or the flap body 5a is/are in particular configured to come into contact with the at least one stop 9 when the flap occupies its first open end position or its second closed end position. For this, the first part 61 of the release device 60 may comprise a stud 610 protruding perpendicularly to the pivot axis P and intended to come into contact with a stop 9.

The first part 61 and second part 62 may in particular be connected by a male/female device 63. This male/female device 63 particular comprises at least one first contact zone 65a able to transmit the rotational movements of the drive device 7 to the flap body 5a towards its first open end position, and at least one second contact zone 65b able to transmit the rotational movements of the drive device 7 to the flap body 5a towards the second closed end position. At least one of the first 65a or second 65b contact zones forms an angle with a parallel to the pivot axis P. Thus when the first part 61 of the release device 60 and/or the flap body 5a is/are in contact with a stop 9, the first part 61 and the second part 62 of the release device 60 tend to move apart from one another by the rotation of the second part 62 via a sliding movement at said contact zone 65a, 65b.

Thus when the flap body 5a or the first part 61 comes into contact with the stop 9, the latter is blocked and can no longer pivot. The pivoting force exerted by the drive device 7 on the second part 62 is converted into a translational force if the contact zone 65a, 65b of the male/female device 63 forms an angle with a parallel to the pivot axis P. In normal circumstances, this translational force is compensated by an opposing force exerted by the second end 5c of the flap 5 which is attached to the support frame 3 at the second pivot connection.

However, in the case where the flap 5 is broken, in particular at its flap body 5a, this opposing force is not present and the translational force causes a sliding of the first part 61 and the portion of the flap body 5c attached thereto along the contact zone 65a, 65b of the male/female device 63 forming an angle with a parallel to the pivot axis P, as illustrated on FIGS. 1 and 2. In FIG. 1 and FIG. 2, the pivoting and translational forces are depicted by arrows. This translation takes place until complete separation of the first part 61 from the second part 62, and the falling under gravity of said first part 61 and the portion of the flap body 5c attached thereto.

This is particularly useful for ensuring that a broken flap 5 does not remain seized in the opening of the support frame in a position which may reduce the performance of the motor vehicle.

The drive device 7 may in particular be configured to extend the rotational movement of the flap 5 when the latter comes into contact with the at least one stop 9. When the flap 5 comes into contact with the stop 9, the drive device 7 and more precisely its actuator 7a may detect the resistance to rotation of the flap 5, for example by measuring the electrical current at the actuator 7a. If the resistance to rotation increases, the drive device may in particular stop its rotation once a given resistance value has been reached.

If the resistance to rotation does not increase, for example because the flap 5 is broken, the drive device 7 may also be configured to stop its rotation when it reaches a predetermined travel exceeding that necessary for reaching the stop 9. The drive device 7 may then send an error signal to an electronic management system in order for example to illuminate an indicator on the instrument panel so as to warn the user of a problem at the blocking device 1.

Figure 12:
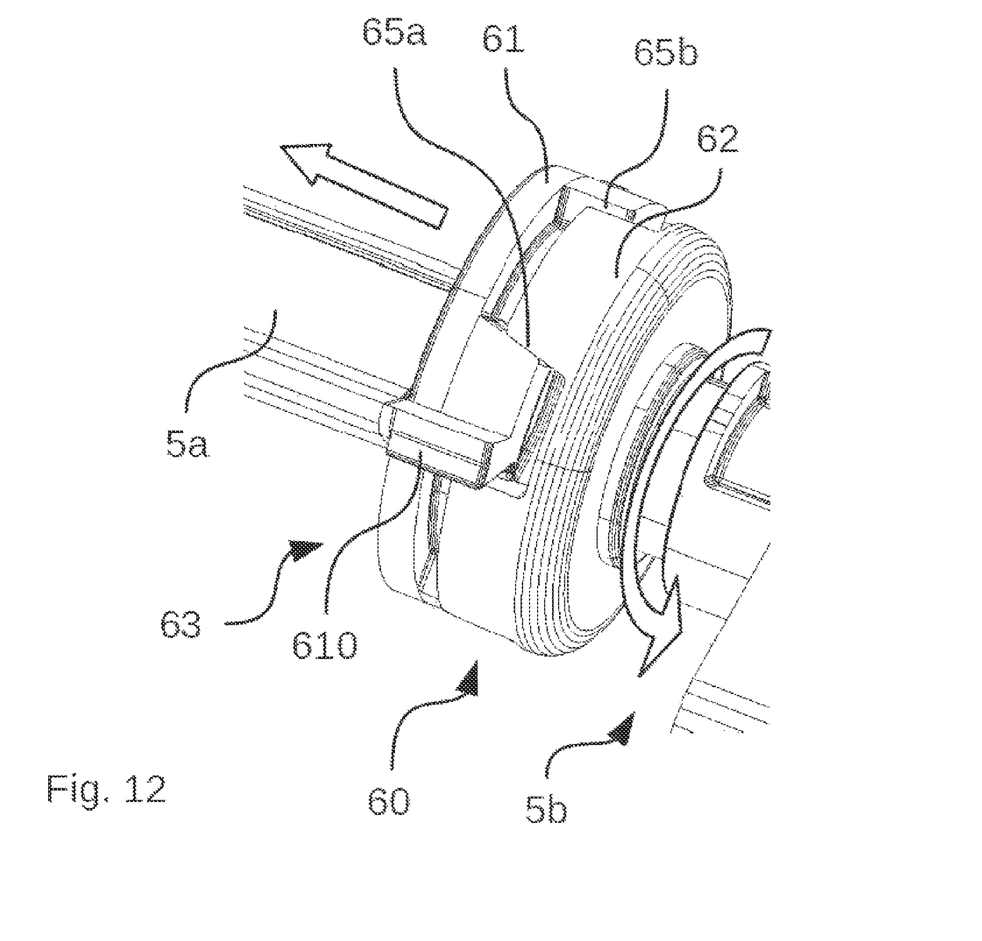
FIG. 12 shows a schematic, perspective illustration of the separation of the first and second parts of the release device.

In the example shown in FIGS. 10, 11 and 12, only the first contact zone 65a between the first part 61 and the second part 62 of the release device 60 forms an angle with a parallel to the pivot axis P. This first contact zone 65a is utilized in particular when the flap 5 comes into contact with a stop 9 in its first open end position, as shown on FIG. 8. However, it is quite possible that this first contact zone 65a is utilized in particular when the flap 5 comes into contact with a stop 9 in its closed end position.

In this example, the second contact zone 65b is itself parallel to the pivot axis P and does not allow the first part 61 and second part 62 of the release device 60 to move apart.

According to an embodiment not shown, the first contact zone 65a and the second contact zone 65b of the male/female device 63 may both form an angle with a parallel to the pivot axis P. Thus in this embodiment, the first part 61 and second part 62 of the release device 60 may move apart both in a first open end position and in a second closed end position.

Figure 13:
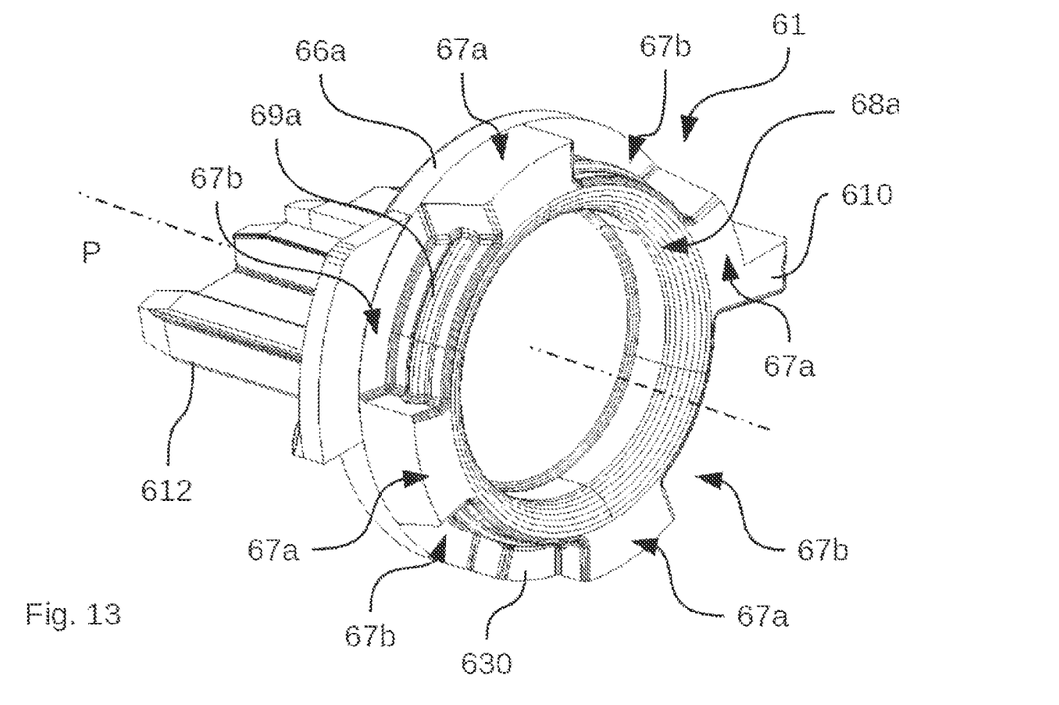
FIG. 13 shows a schematic, perspective illustration of the first part of the release device.
Figure 14:
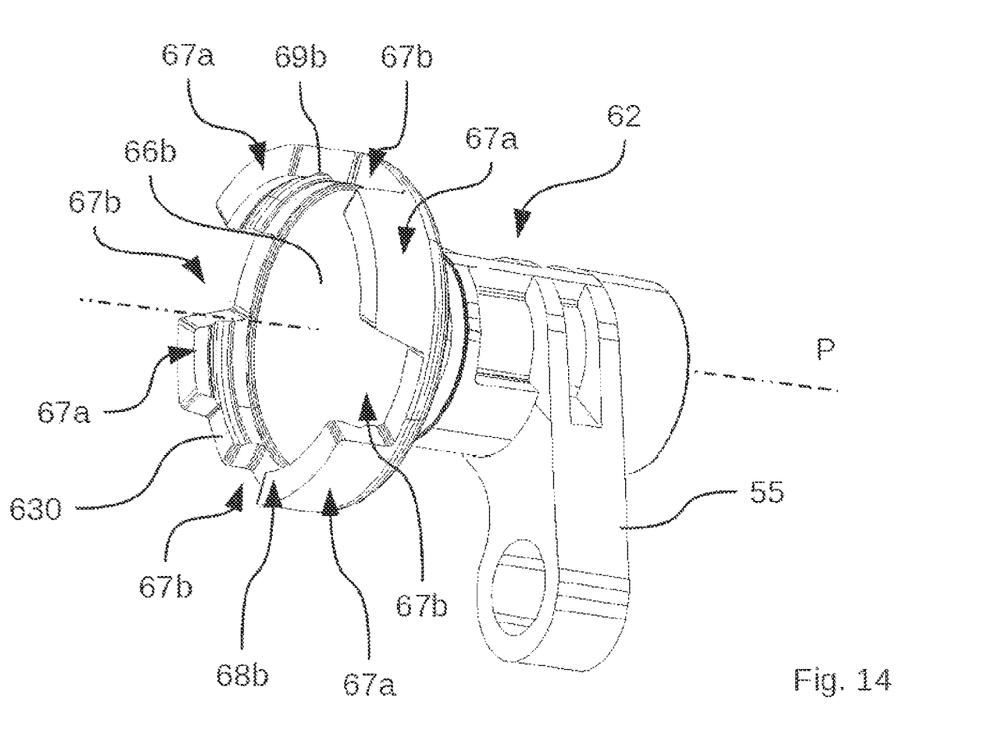
FIG. 14 shows a schematic, perspective illustration of the second part of the release device.
Figure 15:
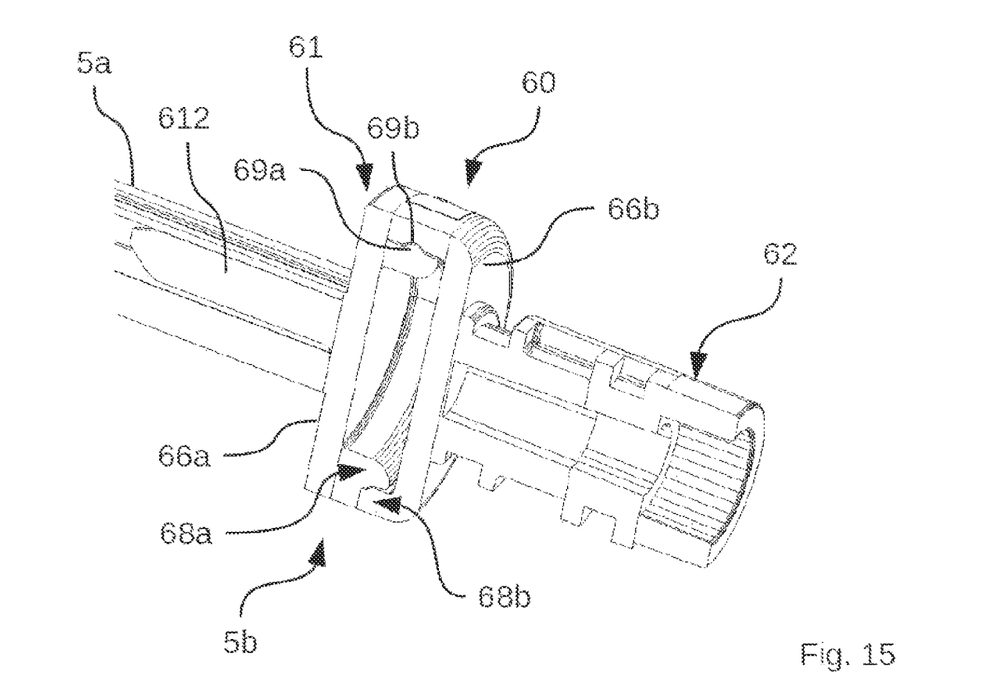
FIG. 15 shows a schematic, cross-sectional perspective depiction of the release device.

FIG. 13 shows an isolated perspective illustration of the first part 61 of the release device 60. FIG. 14 shows an isolated perspective illustration of the second part 62 of the release device 60. FIG. 15 finally shows a sectional depiction of the release device 60. As these FIGS. 13, 14 and 15 show, the male/female device 63 may comprise:
- a first base 66a arranged on the first part 61 of the release device 60,
- a second base 66b arranged on the second part 62 of the release device 60 opposite the first base 66a,
- at least one male member 67a arranged on the one or the other of the first 66a or second bases 66b, said male member 67a protruding parallel to the pivot axis P, and
- at least one female member 67b complementary to the at least one male member 67a and arranged on the base 66a, 66b opposite the base 66a, 66b carrying the at least one male member 67b.

In the example shown in FIGS. 13, 14 and 15, the first base 66a and the second base 66b each comprise four male members 67a and four female members 67b. The first part 61 here also comprises an extension 612 starting from the first base 66a and extending parallel to the pivot axis P and intended to create a connection to an extruded flap body 5a. In the case where the flap 5 is made of one piece, this extension is absent and the first base 66a is made of the same material as the flap body 5a.

The at least one male member 67a or female member 67b may in particular be arranged on a first ring 68a concentric to the pivot axis P and protruding parallel to said pivot axis P. The at least one complementary male member 67a or female member 67b may be arranged on a second ring 68b which is also concentric to the pivot axis P and protrudes parallel to said pivot axis P. The first ring 68a is intended to be inserted inside the second ring 68b in the mounted state, as shown in FIG. 15. The outer wall of the first ring 68a and the inner wall of the second ring 68b comprise a bead 69a/groove 69b pair perpendicular to the pivot axis P, which engage in one another so as to clip the first part 61 to the second part 62.

In the example shown in FIGS. 13, 14 and 15, the first ring 68a is carried by the first part 61, and the second ring 68b by the second part 62. It is naturally quite possible to imagine a case in which the reverse is possible.

Furthermore, the groove 69b is here produced on the inner face of the second ring 68b, and the bead 69a on the outer face of the first ring 68a. It is also possible to imagine the reverse, i.e. where the groove 69b is produced on the outer face of the first ring 68a and the bead 69a on the inner face of the second ring 68b.

The presence of this elastic, nested type of fixing between the first part 61 and second part 62 allows, on separation of the two elements, an ejection force to be exerted on the first part 61 during separation. The first part 61 and the broken flap body 5a attached thereto are then more easily expelled. This reduces the risk that the first part 61 will remain seized in the second part 62.

The male/female device 63 may also comprise a poka-yoke device 630 which allows good positioning of the second part 62 on the first part 61 of the separation device 60. This allows adequate positioning of elements such as the connecting arm 55 relative to the flap body 5a. This poka-yoke device 630 may in particular be formed by a male member 67a and its complementary female member 67b, which have a different shape from the other male 67a and female members 67b.

[56] Thus it is evident that, because it comprises at least one flap 5 with a separating or release device 60, the blocking device 1 not only allows automatic discharge of a broken flap 5 without the need to perform a visual inspection and manual intervention. Furthermore, the release device 60 may allow detection and signalling of a broken flap 5, so that the user of the motor vehicle may plan a repair.

What is claimed is:

1. A blocking device for a front end air inlet of a motor vehicle comprising:
   at least one stop;
   a support frame having at least two lateral uprights and two end cross-pieces connecting the two lateral uprights; and
   at least one flap arranged inside the support frame and pivoting around a pivot axis between a first open end position and a second closed end position, wherein the at least one flap comprises a flap body and a first end connected to the support frame by a first pivot connection,
   wherein the first end of the at least one flap comprises a release device,
   wherein the release device comprises:
      a first part connected to the flap body, and
      a second part arranged opposite the first part and comprising the first pivot connection to the support frame,
   wherein the first part is configured to come into contact with the at least one stop such that the first part and the second part move apart from one another by the rotation of the second part.

2. The blocking device as claimed in claim 1, wherein the first part and second part of the release device are connected by a male/female device comprising at least one first contact zone able to transmit the rotational movements of a drive device to the flap body towards the first open end position, and at least one second contact zone able to transmit the rotational movements of the drive device to the flap body towards the second closed end position, at least one of the first or second contact zones of the male/female device forming an angle with a parallel to the pivot axis.

3. The blocking device as claimed in claim 2, wherein only the first contact zone between the first part and the second part of the release device forms an angle with a parallel to the pivot axis.

4. The blocking device as claimed in claim 2, wherein the first contact zone of the male/female device and the second contact zone of the male/female device both form an angle with a parallel to the pivot axis.

5. The blocking device as claimed in claim 2, wherein the drive device is configured to extend the rotational movement of the flap when the latter comes into contact with the at least one stop, and to detect the resistance to rotation of the at least one flap and stop its rotation on reaching a given resistance value,
   said drive device also being configured to stop its rotation when it reaches a predetermined travel exceeding that necessary for reaching the stop without encountering a resistance to rotation of the at least one flap, and to send an error signal to an electronic management system.

6. The blocking device as claimed in claim 1, wherein male/female device comprises:
   a first base arranged on the first part of the release device,
   a second base arranged on the second part of the release device opposite the first base,
   at least one male member arranged on the one or the other of the first or second bases, said male member protruding parallel to the pivot axis, and
   at least one female member complementary to the at least one male member and arranged on the base opposite the base carrying the at least one male member.

7. The blocking device as claimed in claim 1, wherein the at least one male member or female member is arranged on a first ring concentric to the pivot axis and protruding parallel to said pivot axis, and the at least one complementary male member or female member is arranged on a second ring also concentric to the pivot axis and protruding parallel to said pivot axis,
   the first ring being configured to be inserted inside the second ring,
   the outer wall of the first ring and the inner wall of the second ring comprising a bead/groove pair perpendicular to the pivot axis and engaging in one another so as to clip the first part to the second part.

8. The blocking device as claimed in claim 1, wherein the first part of the release device and the flap body are made of one piece.

9. The blocking device as claimed in claim 1, wherein the flap body is extruded and the first part of the release device is a separate piece fixed to an end of said flap body.

10. The blocking device as claimed in claim 1, wherein the first part of the release device comprises a stud protruding perpendicularly to the pivot axis and configured to come into contact with a stop.

11. The blocking device as claimed in claim 1, wherein the flap body is configured to come into contact with the at least one stop such that the first part and the second part move apart from one another by the rotation of the second part.

12. A blocking device for a front end air inlet of a motor vehicle comprising:
   at least one stop;
   a support frame having at least two lateral uprights and two end cross-pieces connecting the two lateral uprights; and at least one flap arranged inside the support frame and pivoting around a pivot axis between a first open end position and a second closed end position, wherein the at least one flap comprises a flap body and a first end connected to the support frame by a first pivot connection,
wherein the first end of the at least one flap comprises a release device,
wherein the release device comprises:
a first part connected to the flap body, and
a second part arranged opposite the first part and comprising the first pivot connection to the support frame,
wherein the flap body is configured to come into contact with the at least one stop such that the first part and the second part move apart from one another by the rotation of the second part.

13. The blocking device as claimed in claim 12, wherein the first part and second part of the release device are connected by a male/female device comprising at least one first contact zone able to transmit the rotational movements of a drive device to the flap body towards the first open end position, and at least one second contact zone able to transmit the rotational movements of the drive device to the flap body towards the second closed end position, at least one of the first or second contact zones of the male/female device forming an angle with a parallel to the pivot axis.

14. The blocking device as claimed in claim 12, wherein male/female device comprises:
a first base arranged on the first part of the release device,
a second base arranged on the second part of the release device opposite the first base,
at least one male member arranged on the one or the other of the first or second bases, said male member protruding parallel to the pivot axis, and
at least one female member complementary to the at least one male member and arranged on the base opposite the base carrying the at least one male member.

15. The blocking device as claimed in claim 12, wherein the at least one male member or female member is arranged on a first ring concentric to the pivot axis and protruding parallel to said pivot axis, and the at least one complementary male member or female member is arranged on a second ring also concentric to the pivot axis and protruding parallel to said pivot axis,
the first ring being configured to be inserted inside the second ring,
the outer wall of the first ring and the inner wall of the second ring comprising a bead/groove pair perpendicular to the pivot axis and engaging in one another so as to clip the first part to the second part.

16. The blocking device as claimed in claim 12, wherein the first part of the release device and the flap body are made of one piece.

17. The blocking device as claimed in claim 12, wherein the flap body is extruded and the first part of the release device is a separate piece fixed to an end of said flap body.

18. The blocking device as claimed in claim 12, wherein the first part of the release device comprises a stud protruding perpendicularly to the pivot axis and configured to come into contact with a stop.

* * * * *